Figure 1:
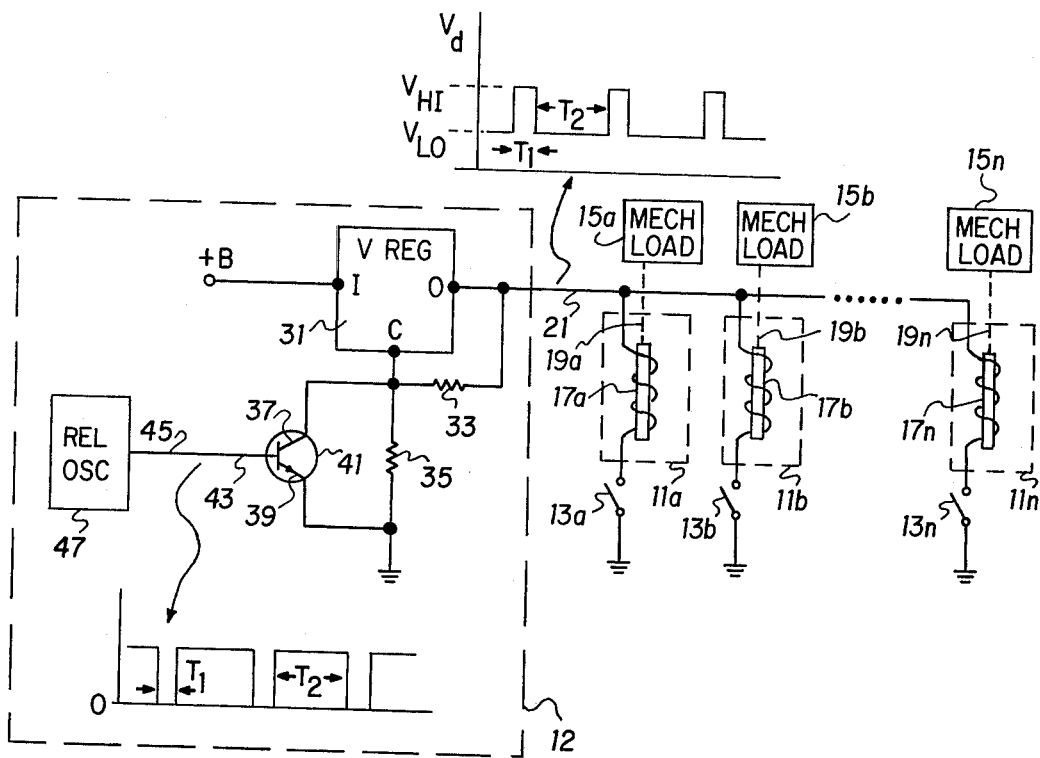

United States Patent [19]
Martin

[11] 3,904,938
[45] Sept. 9, 1975

[54] ELECTROMECHANICAL SYSTEM HAVING IMPROVED ELECTRICAL DRIVING MEANS

[75] Inventor: Kenneth G. Martin, Cedar Rapids, Iowa

[73] Assignee: Rockwell International Corporation, El Segundo, Calif.

[22] Filed: Nov. 15, 1974

[21] Appl. No.: 524,024

[52] U.S. Cl. ............ 317/123; 317/154; 317/DIG. 6
[51] Int. Cl.² ........................................ H01H 47/00
[58] Field of Search........ 317/123, 146, 154, 156 R, 317/DIG. 4, DIG. 6

[56] References Cited
UNITED STATES PATENTS

| | | | |
|---|---|---|---|
| 3,170,095 | 2/1965 | Goldstein | 317/DIG. 6 |
| 3,549,955 | 12/1970 | Paine | 317/DIG. 4 |
| 3,579,052 | 5/1971 | Kato et al. | 317/154 |
| 3,745,420 | 7/1973 | Hafner | 317/146 |
| 3,864,608 | 2/1975 | Normile et al. | 317/DIG. 4 |

*Primary Examiner*—J. D. Miller
*Assistant Examiner*—Harry E. Moose, Jr.
*Attorney, Agent, or Firm*—Terry M. Blackwood; Robert J. Crawford

[57] ABSTRACT

An electromechanical system including an electrical driving means and an electromechanical device incorporating a hysteretic electromagnet. An improved device driving means comprises means for generating a time varying voltage which at substantially regular time intervals is capable of furnishing sufficient current to initially activate the device. Between occurrences of device-activating current capacity, the time varying voltage is capable of furnishing less current yet enough to maintain the active state after initial activation.

6 Claims, 2 Drawing Figures

ELECTROMECHANICAL SYSTEM HAVING IMPROVED ELECTRICAL DRIVING MEANS

The invention described herein was made in the course of, or under, a contract (or grant) with the Department of Transportation.

This invention is related to the driving of electromagnetic types of electromechanical devices.

Solenoids, relays, DC stepping motors with electromagnetic detent, and other similar electromechanical devices incorporating hysteretic electromagnets are generally driven, when called to duty, with a constant DC voltage whose amplitude is sufficient to activate the device and whose duration is for whatever time that particular active state is desired. For instance, to turn "on" a normally "off" relay or solenoid rated at 28 volts DC, the electromagnet is conventionally energized with 28 volts DC for the entire duration of the "on" period. In like manner, for a stepping motor without permanent magnetic detent, each sequential active state (i.e., each step position) is achieved by energizing one or more electromagnets with the full rated voltage for the entire duration of that particular active state (i.e., position).

The large amounts of heat generated and power consumed by such devices when driven in the conventional manner is highly undesirable in some environments such as aircraft cockpits. The problem is especially severe when high density packaging (clustering) of solenoids or relays is required.

Figure 2:
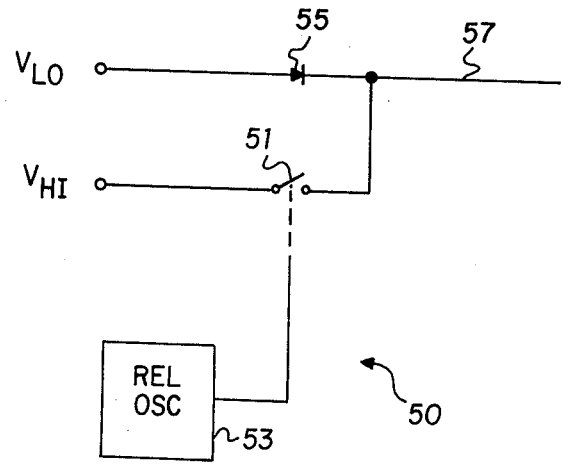

It is thus an object of this invention to provide an electromechanical system including such electromechanical devices which increases operating efficiency and reduces and redistributes energy dissipation. Further objects, features, and advantages of the invention will become more apparent upon reference to the following specification, claims, and appended drawings wherein:

FIG. 1 is a combined schematic and functional diagram of an electromechanical system representing the preferred embodiment of the present invention and also shows waveforms of certain signals within the preferred embodiment; and FIG. 2 is a combined schematic and functional diagram representing a preferred embodiment of an alternate driving means substitutable under certain conditions for driving means included in the system of FIG. 1.

In the electromechanical system illustrated in FIG. 1, electromechanical devices 11a, b, . . . n, are each electrically connected between a driving means 12 and one of switches 13a, b, . . . n, and are each mechanically coupled to one of mechanical loads 15a, b, . . . n. Electromechanical devices 11a, b, . . . n typically comprise clustered solenoids with the mechanical loads 15a, b, . . . n to be moved comprising mechanical indicators. For instance, in a preferred application, each pair of electromechanical devices plus associated mechanical loads represents a prismatic electromechanical annunciator as described in U.S. Pat. No. 3,616,555 assigned to the assignee of the present invention, and the switches represent means for "calling" a particular indicator or readout. In the preferred application, the number of such electromechanical devices (i.e., $n$) is usually between 20 and 50, and is typically 42.

A representative electromechanical device such as 11a comprises a hysteretic electromagnet 17a and armature 19a. Hysteretic electromagnet is used herein to mean an electromagnet which displays the phenomenon of magnetic hysteresis and is intended to distinguish, for example, over an air core coil. Armature is used herein to mean the moving element in the electromechanical device; e.g., the rotating part of a motor, the movable part of a relay or solenoid. To continue, one end of electromagnet 17a is connected to the output 21 of driving means 12 and the other end of electromagnet 17a is connected to a terminal of switch 13a whose other terminal is grounded. Mechanical coupling to load 15a is achieved via armature 19a.

As previously mentioned, conventional practice is to drive electromechanical device 11a by energizing the electromagnet 17a with a relatively constant DC voltage whose amplitude substantially equals the device rated voltage. In accordance with the present invention, the electromechanical device 11a is driven by energizing electromagnet 17a with a time varying voltage. More particularly, in the preferred embodiment, driving means 12 delivers to output 21 and then to one end of electromagnet 17a a time varying drive voltage $V_d$ whose waveform is substantially rectangular, alternately assuming one of two fixed nonzero values. When it is desired to activate electromechanical device 11a, switch 13a is closed and electromagnet 17a becomes energized with drive voltage $V_d$. As will be explained more fully below, the device is not usually activated immediately upon energization of the electromagnet but is usually activated before a period of the cyclic drive voltage has elapsed.

The amplitude $V_{Hi}$ and duration $T_1$ of the larger fixed level is sufficient to furnish the current needed to initially activate the device. That is, since a prescribed current level is required to initially activate such devices and since the current furnished, in response to a voltage step, rises noninstantaneously (i.e., exponentially in accordance with a time constant of $L/R$) toward a peak level, the amplitude and duration of the larger level are chosen so that the prescribed current level is reached during one occurrence of this larger level and the device is thereupon activated. The amplitude of the lesser fixed level $V_{Lo}$ is valued to furnish a lesser current yet one sufficient to maintain the device active state after initial activation. The duration $T_2$ of this lesser level is chosen such that the length of any one period $(T_1 + T_2)$ is substantially equal to an acceptable maximum delay time, for normal operation, between electromagnet energization and device activation.

It is preferred that $V_{Hi}$ be substantially equal to device rated voltage and $V_{Lo}$ be substantially equal to device holding voltage. (The amplitude of the particular voltage at which a device deactivates, or drops out, is dependent upon the temperature at which the device is being operated. For a given range of temperatures, there is a corresponding range of drop out voltages which is bounded by a maximum and a minimum. Device holding voltage is used herein to mean a voltage which is slightly greater than device maximum drop out voltage, and is the minimum voltage which will assuredly keep the electromechanical device active following initial activation.) In the previously mentioned preferred application, the solenoid characteristics are as follows:

internal resistance = 350Ω, rated voltage = 28 $V_{dc}$, minimum drop out voltage approximately = 3.5 $V_{dc}$, and the driving voltage characteristics are as follows:

$V_{Hi}$ = 26 to 28 volts, $V_{Lo}$ = 12 volts, $T_1$ = 0.100 sec, $T_2$ = 0.400 sec. For this particular solenoid and for $V_{Hi}$ = 26 to 28 $V_{dc}$, it has been found that the minimum value of $T_1$ producing activation is about 0.020 to 0.030 sec.

As earlier mentioned, a time lapse is generally experienced between call to duty and device activation. This is in part due to the noninstantaneous charging of current but is primarily due to the random relationship between the instant of switch closure and the driving voltage waveform. If switch closure, which can occur anytime, occurs too long after the waveform rises to the larger level, there will be insufficient current furnished to activate the device until the next occurrence of the larger level. However, the maximum delay is almost always $T_1 + T_2$, which for the preferred embodiment is 0.5 sec.

On rare occasion, and under conditions peculiar to a particular environment in which the inventive system is employed, energization by one full cycle might fail to activate the device. In such instance, the repetitiveness of the waveform becomes important. Since the waveform regularly repeats, there is more than one opportunity for the device to become active after being called.

Each of the remaining electromechanical devices 11b, . . . n is similar in structure, connection, and manner of being driven as the above-described device 11a. Each such device, when called to duty by closure of the appropriate switch, has its electromagnet energized with drive voltage $V_d$ and, after a lapse of time usually no greater than that represented by a cycle, becomes activated.

The driving means 12 in the FIG. 1 system includes a series type of voltage regulator 31 capable of producing, between output terminal O and common terminal C, a regulated voltage whose amplitude is approximately equal to $V_{Lo}$. Typically employed is a type LM-340, 3-terminal series voltage regulator available from National Semiconductor Corporation in Santa Clara, California. Other similar 3-terminal series voltage regulators are commonly available from several semiconductor manufacturers. Connected to input terminal I of voltage regulator 31 is a B+ voltage which in the presently preferred embodiment is +28 volts DC. A resistor 33 is connected between regulator terminals O and C and a resistor 35 is connected between regulator terminal C and ground. Collector 37 and emitter 39 of transistor 41 are respectively connected to terminal C and ground. The base 43 of transistor 41 is connected to the output 45 of relaxation oscillator 47. In the preferred embodiment, resistors 33 and 35 are respectively 750Ω and 1000Ω.

In operation, the potential difference between terminals O and C of regulator 31, Voc, remains substantially equal to $V_{Lo}$ (12 volts in the preferred embodiment). During each of the $T_2$ time spans, since the voltage appearing at the output 45 of relaxation oscillator 47 is positive, transistor 41 turns on and substantially grounds terminal C thus pulling terminal O to an absolute potential level of substantially $V_{Lo}$. During the $T_1$ time spans, transistor 41 is off, terminal C is no longer at ground potential and the current through resistor 33 (= to Voc/750) flows primarily through resistor 35 causing a voltage drop $V_\delta$ therein (approximately = to Voc (1000/750)) which raises the absolute potential at terminal O to Voc + $V_\delta$ = $V_{Hi}$. Actual measurements show $V_{Lo}$ and $V_{Hi}$, for the FIG. 1 embodiment constructed as above described, to be respectively 12 volts and approximately 26 volts. Also, note that since $V_{Hi}$ is primarily dependent on the ratio of resistors 33 and 35 and on the current capacity of voltage regulator 31, the value of B+ is not critical; it is sufficient that B+ be greater than $V_{Hi}$.

The FIG. 1 driving means above described is preferred when only one line voltage of appropriate value is available. FIG. 2 illustrates a driving means 50 substitutable for driving means 12 when two line voltages approximately equal to the desired $V_{Lo}$ and $V_{Hi}$, are available. The waveform of the driving voltage from driving means 50 is substantially identical to the one already described. In this alternate driving means, switch 51, driven by relaxation oscillator 53, is open during $T_2$ and closed during $T_1$. Clamping diode 55 is forward biased during $T_2$ and back biased during $T_1$. Thus at output 57 $V_{Hi}$ appears during $T_1$ and $V_{Lo}$ appears during $T_2$. Switch 51 typically comprises a PNP transistor having emitter connected to $V_{Hi}$, collector connected to output 57, and base driven by relaxation oscillator 53. Other appropriate switches will be apparent to those skilled in the art.

With the FIG. 1 embodiment constructed using the 12-volt regulator, the 28-volt line source, the 750 ohm and 1000 ohm resistors, and a relaxation oscillator to trigger the preferred waveform, power consumption in the driving means, with none of the electromechanical devices active, is about 0.5 watts. With one or more of the devices active, the additional instrument power consumed per active device averages about 1.1 watts. About 0.72 watts of the additional 1.1 watts is consumed by the active electromechanical device itself and the remaining 0.38 watts is consumed in the voltage regulator. When driven conventionally, each active device consumes about 2 watts. Thus it is seen that even if only one electromechanical device is active, there is a reduction in total power consumption of about 2.0 − 1.6 = 0.4 watts. However, the power savings are considerably greater when a larger number of such devices are active. For instance, with 10 active devices driven in the conventional manner, power consumption is 20 watts. With 10 active devices driven with the FIG. 1 driving means, total instrument power consumption = 0.5 + 10 (1.1) = 11.5 watts, a reduction of 8.5 watts or 42 percent with respect to conventional practice.

When conditions permit the use of the FIG. 2 driving means, power savings are even more dramatic. There is very little power consumed, typically 0.1 watt in the driving means, with none of the electromechanical devices active. The additional power consumed per device in the driving means when any electromechanical devices are active varies with the number activated from about 0.04 watts/device to about 0.114 watts/device. The power consumed by each active device, as already shown, is about 0.72 watts. Thus, for one active device, the power savings with respect to conventional practice is [2.0 − (0.72 + 0.1 + 0.04)], or about 1.1 watts and for 10 active devices is at least [20 − (7.2 + 1.14 + 0.1)], or about 11.6, watts.

Also important is that with either driving means, power dissipation at the physical location of the clustered electromechanical devices is reduced. For the preferred application, a reduction from 2 watts dissipation per device to 0.72 watts dissipation per device significantly reduces the temperatures surrounding the clustered solenoids.

It should be apparent from the foregoing that certain details of the preferred embodiment are not essential in the implementation and practice of the principles of the present invention. For instance, although a rectangular waveform is presently preferred primarily for its simplicity and efficiency, other waveforms, although perhaps not as advantageous, may be employed to take at least some advantage of the inventive principles herein. For example, by adding a sinusoidal waveform of appropriate frequency and peak amplitude to a DC voltage of appropriate value, a resultant waveform may be established whose peaks are sufficient to initially activate the device and whose minimums are sufficient to hold in the device once activated. Also, a sinusoidal waveform of appropriate frequency, peak amplitude, and initially having no DC component, could be clamped at a device holding value, and, if desired, clipped to establish a maximum value. Also, either of the above could be accomplished with a triangular or saw-toothed waveform instead of a sinusoidal waveform. Moreover, the voltage waveform need not repeat identically from one cycle to the next. For example, the above described rectangular waveform could be modified such that during one cycle $V_{\scriptscriptstyle H}$ and $T_1$ are at the preferred values, but for the succeeding cycle $T_1$ is slightly reduced and $V_{\scriptscriptstyle H}$ is slightly increased.

Thus it is seen that it is sufficient to the practice of this invention that the waveform regularly provide alternate levels of current, one at least sufficient for activating the device, and another less than the first but at least sufficient for maintaining the active state. Moreover, either or both of these levels may be permitted to vary somewhat from cycle to cycle.

Thus while particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. The method of driving an electromechanical device incorporating a hysteretic electromagnet, said method comprising:
generating a time varying voltage which at substantially regular time intervals is capable of furnishing sufficient current to initially activate the device, and which, between occurrences of device-activating current capacity, is capable of furnishing less current yet enough to maintain the active state after initial activation; and energizing with said time varying voltage, said electromagnet of said electromechanical device.

2. The method as defined in claim 1 wherein the waveform of said time varying voltage is substantially rectangular, alternately assuming one of two substantially fixed values.

3. The method as defined in claim 2 wherein the first of said two fixed values is approximately equal to the rated voltage of the device and the second of said two fixed values is approximately equal to the holding voltage of the device.

4. In an electromechanical system of the type wherein an electrical driving means drives an electromechanical device incorporating a hysteretic electromagnet, an improved device driving means comprising means for generating a time varying voltage which at substantially regular time intervals is capable of furnishing sufficient current to initially activate the device, and which, between occurrences of device-activating current capacity, is capable of furnishing less current yet enough to maintain the active state after initial activation.

5. The electromechanical system as defined in claim 4 wherein the waveform of said time varying voltage is substantially rectangular, alternately assuming one of two substantially fixed values.

6. The electromechanical system as defined in claim 5 wherein the first of said two fixed values is approximately equal to the rated voltage of the device and the second of said two fixed values is approximately equal to the holding voltage of the device.

* * * * *